United States Patent [19]
Miller et al.

[11] Patent Number: 5,747,785
[45] Date of Patent: May 5, 1998

[54] INTEGRATED HAND-HELD BAR CODE PROCESSING DEVICE CAPABLE OF AUTOMATIC SCAN AND DATA DISPLAY

[76] Inventors: Phillip Miller, 4114 Sunshine St., SW., Cedar Rapids, Iowa 52401; Jerry L. Walter, 387 St. Olaf St., SW., Cedar Rapids, Iowa 52404; Darrell L. Boatwright, 5731 Michael Dr. NE., Cedar Rapids, Iowa 52402; Darald R. Schultz, 3861 Trailridge Rd. SE., Cedar Rapids, Iowa 52403

[21] Appl. No.: 453,210

[22] Filed: May 30, 1995

Related U.S. Application Data

[62] Division of Ser. No. 371,747, Jan. 12, 1995, which is a continuation of Ser. No. 257,433, Jun. 8, 1994, abandoned, which is a continuation of Ser. No. 832,052, Feb. 6, 1992, abandoned, which is a continuation-in-part of Ser. No. 600,053, Oct. 17, 1990, abandoned, which is a continuation of Ser. No. 136,097, Dec. 21, 1987, abandoned, said Ser. No. 832,052, is a continuation-in-part of Ser. No. 305,302, Jan. 31, 1989, abandoned.

[51] Int. Cl.$^6$ ............................................. G06K 7/10
[52] U.S. Cl. ................................... 235/472; 235/462
[58] Field of Search ................... 235/462, 472, 235/454, 455, 375; 250/227.15

[56] References Cited

U.S. PATENT DOCUMENTS

| | | |
|---|---|---|
| D. 308,865 | 6/1990 | Weaver et al. .................. D14/100 |
| D. 311,393 | 10/1990 | Weaver et al. .................. D14/100 |
| 3,621,265 | 11/1971 | Berler . |
| 4,088,981 | 5/1978 | Gott .................. 340/146.3 |
| 4,377,741 | 3/1983 | Brekka et al. . |
| 4,387,297 | 6/1983 | Swartz et al. . |
| 4,409,470 | 10/1983 | Shepard et al. . |
| 4,458,238 | 7/1984 | Learn . |
| 4,460,120 | 7/1984 | Shepard et al. . |
| 4,496,831 | 1/1985 | Swartz et al. . |
| 4,603,262 | 7/1986 | Eastman et al. . |
| 4,621,189 | 11/1986 | Kumar . |
| 4,673,805 | 6/1987 | Shepard et al. . |
| 4,684,793 | 8/1987 | Kamhuber . |
| 4,689,478 | 8/1987 | Hale et al. .................. 235/380 |
| 4,706,096 | 11/1987 | Sato . |
| 4,713,617 | 12/1987 | Michalski .................. 324/395 |
| 4,721,849 | 1/1988 | Davis et al. .................. 235/472 |
| 4,758,717 | 7/1988 | Shepard et al. .................. 235/472 |
| 4,760,248 | 7/1988 | Swartz et al. . |
| 4,805,175 | 2/1989 | Knowles . |
| 4,808,018 | 2/1989 | Robertson et al. . |
| 4,845,350 | 7/1989 | Shepard et al. . |
| 5,107,100 | 4/1992 | Shepard et al. . |
| 5,157,687 | 10/1992 | Tymes . |
| 5,218,187 | 6/1993 | Koenck et al. .................. 235/462 X |

FOREIGN PATENT DOCUMENTS 3248287  11/1991  Japan .

OTHER PUBLICATIONS

P.J. Kennedy, "Hand-Held Data Input Device", IBM Technical Disclosure Bulletin, vol. 26, No. 11, Apr. 1984.

*Primary Examiner*—Donald T. Hajec
*Assistant Examiner*—Le Thien Minh

[57] ABSTRACT

In an exemplary embodiment, the reader unit has a pistol configuration with the automatic scan components in a barrel portion and a battery pack therefor in a handgrip portion. A display may be directed upwardly and rearwardly in the normal hand-held disposition of the reader unit during scanning, and may be of relatively large area, e.g., so as to be adaptable to direct store delivery transactions. A smart card receptacle may facilitate use of the integrated reader and terminal unit for complex transactions. A base station for the hand-held unit may include an interface such that the memory of the hand-held unit appears as a disk drive during downloading to a personal computer.

24 Claims, 6 Drawing Sheets

INTEGRATED HAND-HELD BAR CODE PROCESSING DEVICE CAPABLE OF AUTOMATIC SCAN AND DATA DISPLAY

CROSS REFERENCE TO RELATED APPLICATIONS

The present application is a divisional of application Ser. No. 08/371,747, filed Jan. 12, 1995; which is a continuation of application Ser. No. 08/257,433, filed Jun. 8, 1994, now abandoned; which is a continuation of application Ser. No. 07/832,052, filed Feb. 6, 1992, now abandoned; which is a continuation-in-part of application Ser. No. 07/600,053, filed Oct. 17, 1990, now abandoned; which is a continuation of application Ser. No. 07/136,097, filed Dec. 21, 1987, now abandoned; said application Ser. No. 07/832,052 being also a continuation-in-part of application Ser. No. 07/305,302, filed Jan. 31, 1989, now abandoned. Application Ser. No. 07/305,302 is hereby incorporated herein by reference.

BACKGROUND OF THE INVENTION

In a typical portable laser scanning system, a hand-held unit contains the laser scanning head, while a body harness supports the remaining scanner system circuitry. A cable interconnects the scanner head with the body harness.

In a field of portable scanners utilizing image sensors such as charge coupled device photosensor arrays, the scanner system also typically comprises a hand-held scanner unit and a separate terminal unit containing a battery pack which supplies energy for flash illumination of the light source means.

An improved laser bar code scanner system is disclosed in a pending application assigned to the present assignee, U.S. Ser. No. 905,779 filed Sep. 10, 1986, Attorneys Docket No. 5726, now U.S. Pat. No. 4,882,476, and this disclosure is incorporated herein by reference in its entirety. Such a system utilizes a deflected beam which may cover an entire bar code at a rate of thirty-six scans per second, and from the standpoint of the operator can be regarded as an instantaneous type bar code scanner. In particular such a deflected beam scanner is essentially instantaneous in comparison with a wand-type scanner which is manually moved across a bar code over a time interval of the order of one second.

Examples of instantaneous scanners which utilize an array of photosensor elements to register an image of a bar code include those disclosed in U.S. Pat. Nos. 4,282,425 and 4,570,057, and in a pending patent application U.S. Ser. No. 894,689 filed Aug. 8, 1986, Attorneys Docket No. 5740, now U.S. Pat. No. 4,877,949, each of these being assigned to the present assignee. The disclosure of said application Ser. No. 894,689 is hereby incorporated herein by reference in its entirety.

SUMMARY OF THE INVENTION

In accordance with an illustrated embodiment of the invention, a non-contact automatic scan bar code reader device having either deflected beam scanning and concurrent serial reading of the bar code, or having optics for focusing of the bar code on an image type sensor array, is further provided with an integral keyboard and display. Preferably such integrated scanner and terminal unit is comfortably held in an orientation providing a generally vertically disposed handgrip and a generally upwardly directed display so that the display is readily visible to the operator during scanning operation without requiring awkward maneuvering.

In a further preferred development, the integrated instant scanner and terminal unit is provided with a display which is inclined at an acute angle so as to be directed generally rearwardly and upwardly when the handgrip is essentially vertically disposed; this configuration provides for optimum readability of the display during scanning operation.

To further enhance the versatility, in a most preferred embodiment, a smart card receptacle is provided. In this way an initial set of data previously recorded on the card can be made accessible to the unit in an extremely quick and convenient manner. Furthermore, during a transaction, information may be added or modified on the card, so that the card provides a record of transactions which can be readily removed from the hand-held unit, and transported independently of the unit, e.g. in the user's pocket.

Where data is to be downloaded from the combined instant scanner and terminal unit, it is conceived that the unit may emulate a disk drive and be interfaced to a personal computer so that commands which are standard for the case of a disk drive may be used in communication with the hand-held unit.

Various objects, features and advantages of the invention will be apparent from the following detailed description taken in connection with the accompanying drawings, and from the individual features of the appended claims.

DETAILED DESCRIPTION

Figure 1:
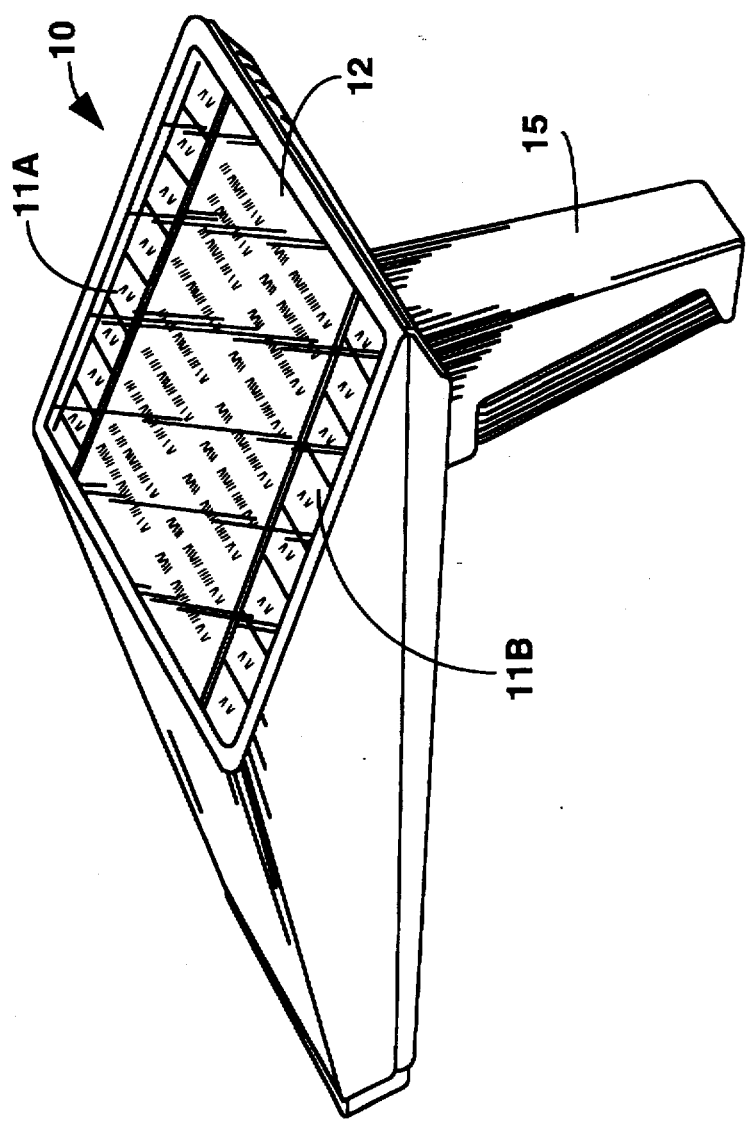
FIG. 1 is a somewhat diagrammatic perspective view of an integrated hand-held bar code processing device capable of automatic scan and data display and which may incorporate features shown in FIGS. 2 and 3.
Figure 2:
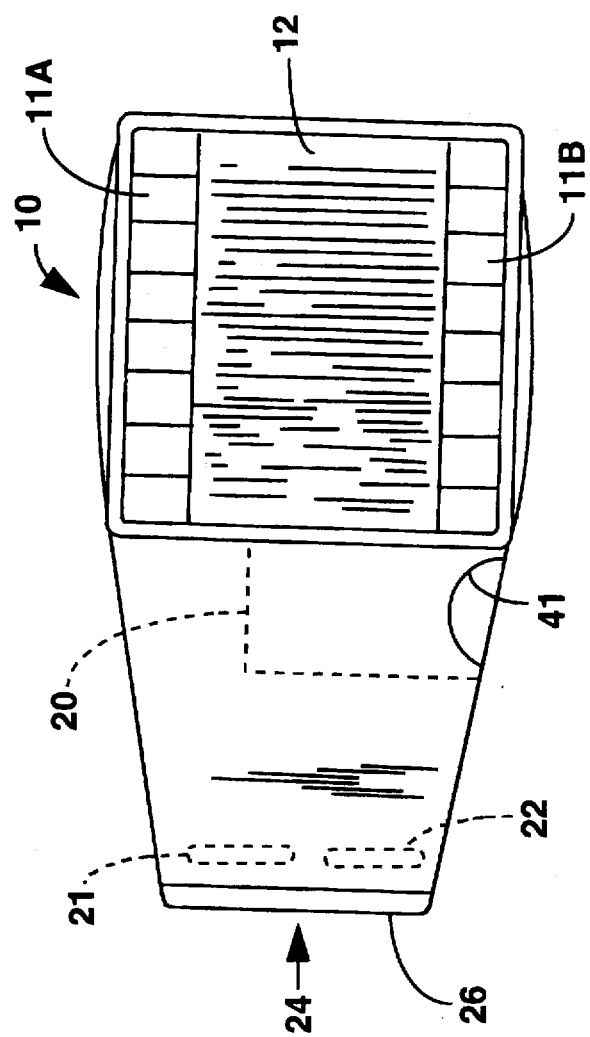
FIG. 2 is a somewhat diagrammatic top plan view of the integrated scanner and terminal device of FIG. 1, and illustrating further preferred features.
Figure 3:
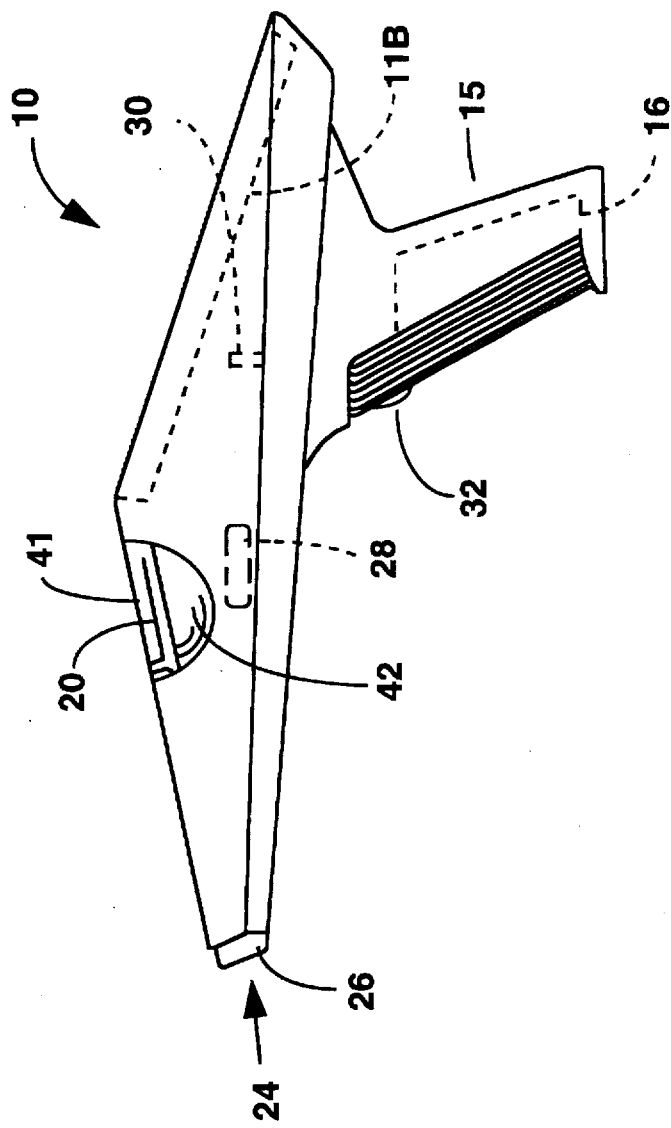
FIG. 3 is a somewhat diagrammatic side elevational view of the integrated scanner and terminal unit of FIG. 1, but also illustrating the further preferred features of FIG. 2.

FIGS. 1, 2 and 3 illustrate an integrated automatic scan bar code reader and terminal device 10 of a generally pistol configuration having either deflected beam scanning, e.g., a cyclically deflected laser beam as in the incorporated patent application Ser. No. 905,779, or a flash type full image scanner such as disclosed in the incorporated patent application Ser. No. 894,689. The device 10 may have all of the features described in the Summary of the Invention, with a generally horizontal barrel portion of the pistol configuration including an integral keyboard, e.g., provided by keyboard segments 11A and 11B, and a display 12 directed generally rearwardly and upwardly when the grip 15 is held in its normal generally vertical orientation. The display 12 may display the results of each bar code scanning operation, battery parameters, and the like, just as was previously done on a separate hand-held terminal coupled by cable with a scanner. Handgrip 15 may contain a battery pack 16 for supplying all required power to the reader and terminal device 10. By way of example, a smart card receptacle is indicated at 20, FIGS. 2 and 3.

In the particular illustrated embodiment of FIGS. 1, 2 and 3, the scanner components are in the barrel portion of the pistol configuration and may include flashable light sources 21, 22 for directing light energy through a window at an end face 24 of the unit so as to substantially uniformly illuminate a bar code disposed in front of the unit. A hard rubber rim 26 may frame the window. Reflected light representing an image of a bar code may be focused by means of optics 28, FIG. 3, onto a charge coupled device photosensor array 30. A scan trigger 32 on the handgrip 15, FIG. 3, may serve to actuate a scan switch for producing an instantaneous flash illumination of the bar code by means of light sources 21, 22. Components 21, 22, 28 and 30 may correspond essentially with the comparable components of the incorporated patent application Ser. No. 894,689.

In FIGS. 2 and 3, smart card receptacle 20 is shown as having associated finger-receiving indentations 41, 42 for accommodating gripping of an edge of the smart card during insertion and removal of the card. An explanation concerning smart cards and the interfacing therewith is found in an article in *IEEE Spectrum*, February 1984, at pages 43-49. An earlier hand-held terminal with a smart card receptacle is shown in patent application Ser. No. 897,547, filed Aug. 15, 1986, Attorneys Docket 5769, which is assigned to the instant assignee.

As another example of scanner components which may be incorporated in unit 10, reference is made to the third, fourth, fifth and sixth figures of the incorporated patent application Ser. No. 905,779. An exemplary commercial laser scanner is represented by the Model LS8110 laser scanner available from Norand Corporation, Cedar Rapids, Iowa. This system utilizes as scan element a low mass single mirror, and has as a light source a 780 nanometer laser diode. The scan rate is thirty-six scans per second. Such a commercial laser scanner can be integrated with unit 10, essentially by attaching the laser scanner immediately in front of the smart card receptacle 20. The handle of the laser scanner would then be disposed in front of handgrip 15 and would provide the scan trigger instead of trigger 32. The laser scanner handle could contain the laser printed circuit board for both scanning and decoding while the handgrip 15 would contain the battery pack as indicated at 16.

For a more compact configuration, the smart card receptacle could be integrated into the present top wall of the LS8110 laser scanner. Further the handle and handgrip could be integrated into a single generally vertically disposed member so that the unit would be held in one hand and in the same way during scanning and during keyboard operation. In another version, the handle and handgrip could be connected at their lower ends, with a slot therebetween accommodating the fingers of one hand during manual grasping of handgrip 15 and during operation of trigger 32, located as in FIG. 3 on the handgrip 15.

A scanner terminal unit of the configurations here described may have a display 12 four inches wide by six inches in height so as to be adaptable to direct store delivery transactions, e.g., where the smart card in receptacle 20 may contain the information of an invoice listing all items and prices for goods being delivered to a retail store or the like. The display may be of the touch screen or liquid crystal type, and in either case may have key positions at 11A, 11B, e.g., of a membrane keyboard type. The unit may contain all the components required to accomplish scanning, decoding, display of decoded bar code data, direct store delivery transaction processing and display, computing, communications, power supply, and interfacing to other devices such as a personal computer as previously described in the Summary of the Invention. Exemplary components would include surface mount technology (SMT) CMOS memory, lithium backup batteries for memory retention, non-contact scanner, user replaceable EPROM, e.g., in the form of a smart card whose contents can be uploaded into the battery backed CMOS memory, and battery power for the scanner and terminal components, e.g., inexpensive user replaceable non-rechargeable cells, or a rechargeable nickel-cadmium battery pack. Two way optical communication with a separate base unit may be provided using a visible aiming light emitting diode which is disclosed in the incorporated patent application Ser. No. 894,689, and also is part of the LS8110 laser scanner. The hand-held unit may be microprocessor controlled and may operate from programming stored in random access memory that is lithium battery backed up. The entire unit may be environmentally sealed and water resistant, and free of connecting cables such as were common in the prior art.

Figure 4:
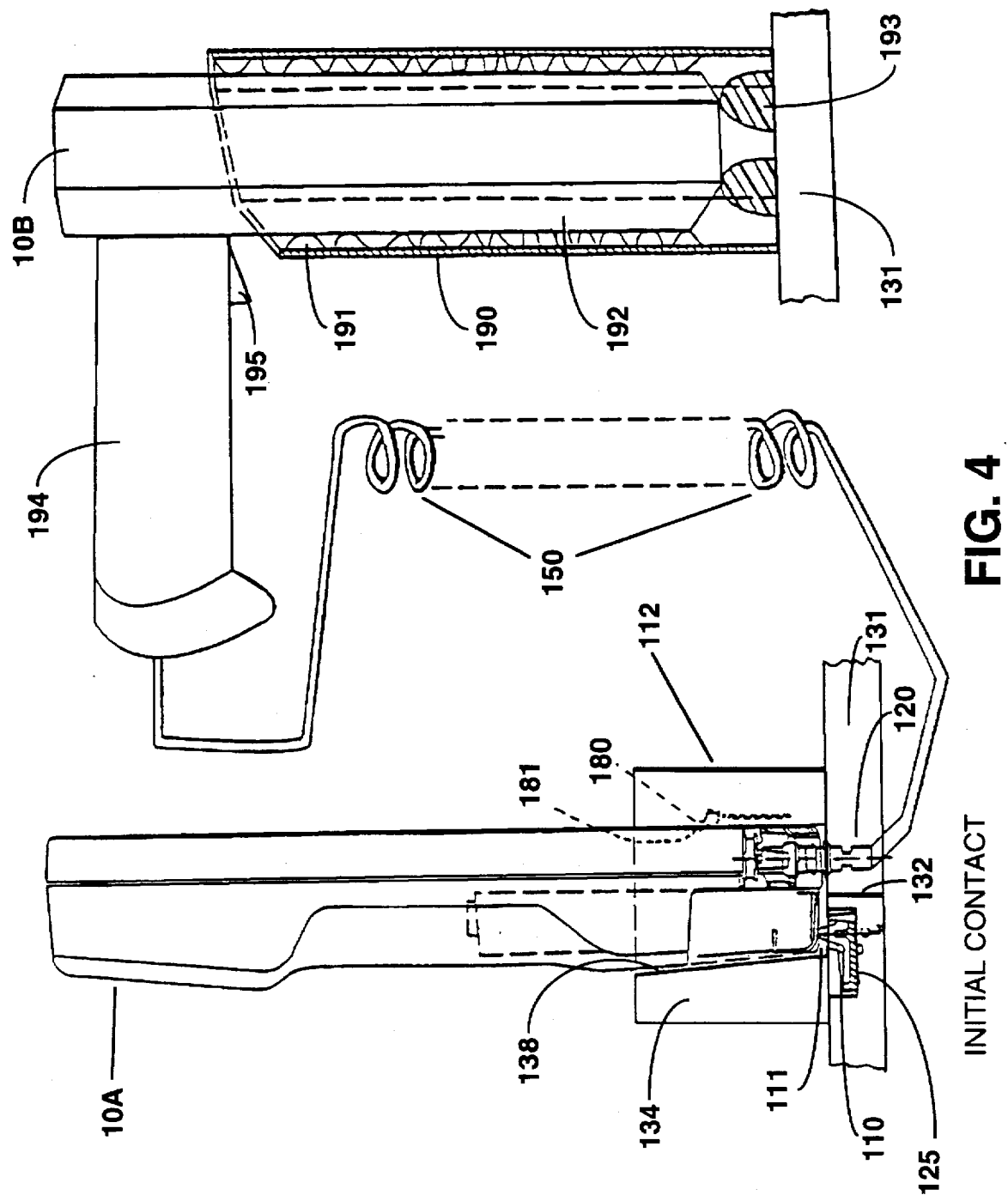
FIG. 4 is a somewhat diagrammatic partial vertical sectional view illustrating constructional details of a preferred adapter, a portable battery powered terminal being shown as being inserted part way into the adapter channel, to the point of initial electrical contact, and also indicating in diagrammatic fashion a laser bar code scanner device in a separate vehicle mounting or holster means and coupled with the terminal via an extendable coiled cable.
Figure 5:
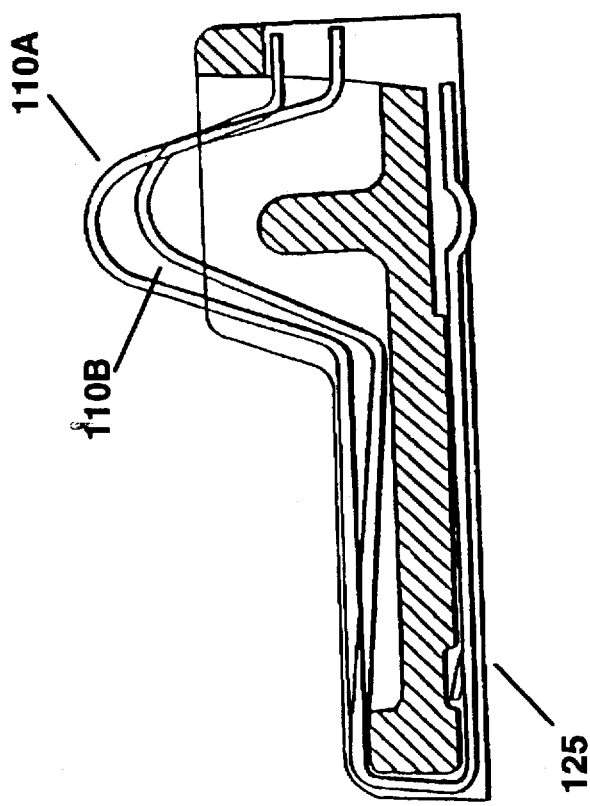
FIG. 5 is a somewhat diagrammatic longitudinal sectional view showing the adapter contact assembly of FIG. 4 on a greatly enlarged scale.

Battery charging contacts may be provided at the lower end of the handgrip 15, shown in FIGS. 1 and 2, that make contact with charging studs on the base unit for recharging of the batteries. While FIGS. 1 and 3 show the device 10 as a single, integrated bar code reader and terminal device, device 10 may be separated into an optical or RF scanner 10B and a terminal 10B. The RF scanner 10B is connected by a cable 150 and cable fitting 120 with a connector of the terminal 10B. The handle 15 of FIGS. 1 and 3 may contain a series of external contacts corresponding to contacts 111, as shown in FIGS. 4 and 5, for engaging with spring fingers corresponding to fingers 110, FIGS. 4 and 5. In a preferred embodiment, conductive contacts 111 are exposed, e.g., at an undersurface of each terminal device 10B. It is understood that similar contacts may be connected to the terminal 10, as shown in FIGS. 1-3. Referring to FIG. 4, the terminal device 10A is shown in initial contact with an adapter indicated at 112, with a connector 120 leading to a scanner 10B located in the open area of the adapter. The adapter may have a contact assembly 125 including spring fingers 110 aligned with respective terminal contacts 111. FIG. 5 is an enlarged view of contact assembly 125 and shows the initial position of contact finger 110 at 110A, and shows a deflected position at 110B (the terminal being fully inserted into and frictionally held by the adapter to maintain the deflected condition 110B of the spring fingers).

Figure 6:
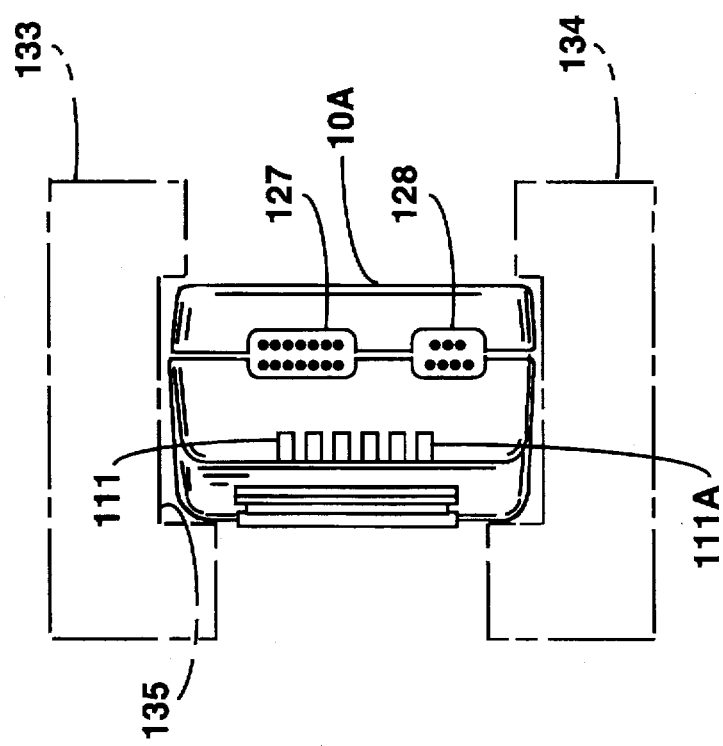
FIG. 6 is a diagrammatic bottom plan view of the terminal of FIG. 4, illustrating the external contact area of the terminal and also the connector fittings for coupling the terminal with a scanner such as the hand-held laser bar code scanner which is diagrammatically indicated in FIG. 4.

FIG. 6 is a bottom plan view of the terminal device 10A, showing its set of contacts such as 111, and showing connector fittings at 127 and 128 which may receive the scanner connector 120. In FIGS. 4 and 6, adapter 112 is shown as comprising a base part 131 which may be notched at 132 to accommodate scanner fitting 120, and a pair of upstanding generally C shaped parts 133 and 134 which define a channel 135 for receiving the terminal 10. The parts 133 and 134 may have sloping surfaces such as 136, FIG. 4, which limit the downward movement of a terminal into the receiving channel, and serve to frictionally retain the terminal with a suitable degree of pressure between contacts such as 111 and mating spring fingers such as 110.

The base unit may be a desk top type and include a charger for nickel cadmium batteries contained in the scanner terminal unit. The base unit may include a receptacle for user replaceable EPROMS so that new programming in the base unit can be uploaded into the hand-held unit when coupled with the base unit. Optical two way communication with the hand-held unit via the bar code reader window would free the interface of a mechanical connection for data communication.

It will be apparent that many modifications and variations may be effected without departing from the scope of the teachings of the present disclosure.

We claim as our invention:

1. In a data capture system, a portable hand-held data terminal comprising:

(a) a generally planar terminal undersurface, said terminal undersurface positioned to be directed away from a user when the data terminal is being held;

(b) an inclined surface having a display to display information to a user, said inclined surface being inclined relative to said undersurface;

(c) an integrated automatic indicia reader capable of reading optical indicia located externally of the data terminal positioned on an end of the terminal which is distal relative to the user;

(d) a pressure sensitive screen to accept input of data by application of pressure to a given area of said pressure sensitive screen by the user; and (e) wherein said display is directed generally upwardly and rearwardly toward a user's face, so as to be readily visible to the user, when said integrated automatic indicia reader is directed forwardly, and not generally upwardly or downwardly, toward optical indicia to be read.

2. In the data capture system according to claim 1, wherein the portable hand-held data terminal further comprises a battery for supplying power to the portable hand-held data terminal.

3. In the data capture system according to claim 2, wherein said battery is rechargeable and wherein the data capture system further comprises a base unit capable of mating with the portable hand-held data terminal, said base unit including electrical contacts for charging said battery.

4. In the data capture system according to claim 1, wherein the portable hand-held data terminal further comprises an optical communication device for wirelessly communicating with a non-integrated component of the data capture system.

5. In the data capture system according to claim 3, wherein the portable hand-held data terminal further comprises an optical communication device for wirelessly communicating with said base unit.

6. In the data capture system according to claim 1, wherein a base unit optical communication device is provided for wirelessly communicating with the portable hand-held data terminal.

7. In the data capture system according to claim 3, wherein said integrated automatic indicia reader is capable of wireless optical communication with a non-integrated component of the data capture system.

8. In the data capture system according to claim 3, wherein said integrated automatic indicia reader is capable of wireless optical communication with said base unit.

9. In the data capture system according to claim 3, wherein said base unit further comprises a receptacle designed to physically and electrically receive a module containing information to be transferred to the portable hand-held data terminal when the portable hand-held data terminal has been mated with said base unit.

10. In the data capture system according to claim 1, wherein the portable hand-held data terminal further comprises surface mount technology CMOS memory.

11. In the data capture system according to claim 1, wherein said integrated automatic indicia reader is an essentially instantaneous, non-contact laser scanner.

12. In the data capture system according to claim 1, wherein said integrated automatic indicia reader is an essentially instantaneous, non-contact system further comprising a charge coupled device photosensor array.

13. In the data capture system according to claim 1, wherein the portable hand-held data terminal further comprises a membrane keyboard.

14. In the data capture system according to claim 1, wherein the portable hand-held data terminal further comprises an actuator for activating said integrated automatic indicia reader.

15. In the data capture system according to claim 1, wherein said display has dimensions of approximately four inches by six inches.

16. In a data capture system, a portable hand-held data terminal comprising:

(a) a generally planar terminal undersurface, said terminal undersurface positioned to be directed generally downwardly when the data terminal is held;

(b) an inclined surface having a display to display information to a user, said inclined surface being inclined relative to said undersurface;

(c) an integrated automatic indicia reader to read optical indicia located externally of the data terminal;

(d) at least one pressure sensitive key, located on said inclined surface, to send a signal to the data terminal when said key has been activated; and (e) wherein said inclined surface is directed generally upwardly and rearwardly toward a user's face, so that said display is readily visible to the user, when said integrated automatic indicia reader is directed forwardly, and not generally upwardly or downwardly, toward the optical indicia to be read.

17. A data capture system according to claim 16, wherein said integrated automatic indicia reader is positioned on an end of the data terminal which is distal relative to the user.

18. In a data capture system, a portable hand-held data terminal comprising:

(a) a generally planar terminal undersurface, positioned to be directed generally downwardly when the data terminal is held;

(b) an inclined surface having a display to display information, said inclined surface being inclined relative to said undersurface;

(c) an integrated automatic indicia reader to read optical indicia located externally of the data terminal;

(d) at least one pressure sensitive key, located on said inclined surface, to send a signal to the data terminal when said key has been activated;

(e) a support, positioned on said terminal undersurface under at least one said pressure sensitive key, to facilitate user support of the terminal during use; and (f) wherein said inclined surface is directed generally upwardly and rearwardly so that said display is readily visible when said integrated automatic indicia reader is directed forwardly toward optical indicia to be read.

19. In a data capture system, a portable hand-held data terminal according to claim 18, wherein said support extends downwardly from said undersurface.

20. In a data capture system, a portable hand-held data terminal according to claim 18, wherein said support further comprises an actuator to send a signal to the data terminal when said actuator has been actuated.

21. In a data capture system, a portable hand-held data terminal according to claim 19, wherein said support is a handle providing a pistol-style grip.

22. In a data capture system, a portable hand-held data terminal according to claim 20, wherein actuation of said actuator activates said integrated automatic indicia reader.

23. In a data capture system, a portable hand-held data terminal according to claim 18, wherein said support can receive an auxiliary component.

24. In a data capture system, a portable hand-held data terminal according to claim 23, wherein said auxiliary component is a battery to provide operating power to the data terminal.

* * * * *